United States Patent

Schlichte

[15] 3,688,049

[45] Aug. 29, 1972

[54] PCM TIME DIVISION MULTIPLEX PROCESS

[72] Inventor: Max Schlichte, 8000 Munich, 71, Germany

[73] Assignee: Siemens Aktiengesellschaft, Berlin and Munich, Germany

[22] Filed: Aug. 26, 1970

[21] Appl. No.: 66,984

[30] Foreign Application Priority Data

Aug. 28, 1969 Germany..........P 19 43 768.4

[52] U.S. Cl. ............................................179/15 AQ

[51] Int. Cl. ................................................H04j 3/16

[58] Field of Search...........179/15 A, 15 AD, 15 AT, 15 AQ, 179/15 BY

[56] References Cited

UNITED STATES PATENTS 3,236,951 2/1966 Yamamoto ...........179/15 AQ

*Primary Examiner*—Ralph D. Blakeslee

*Attorney*—Birch, Swindler, McKie & Beckett

[57] ABSTRACT

A process for jointly completing a connection for both transmission directions in a pulse code modulated telecommunication network having a plurality of exchange stations connected over four wire time division multiplex lines. The system operates according to the invention to complete a connection in segments simultaneously for both transmission directions without the need for frame equalization.

4 Claims, 6 Drawing Figures

PCM TIME DIVISION MULTIPLEX PROCESS

BACKGROUND OF THE INVENTION

This invention relates to telecommunication systems, and in particular to those systems where the analog information signals are converted into digital signals and transmitted on a time multiplex basis.

In conventional telecommunication systems, in particular telephone exchange installations, a transmission of continuous analog signals takes place in spatially separated transmission channels. Newer telephone exchange installations do not use the space division multiplex principle, but the time division multiplex principle, whereby discontinuous analog signals are transmitted. In addition telephone exchange installations have increasingly gained importance wherein a transmission of discontinuous digital signals takes place. In this connection pulse code modulation (PCM) has achieved special importance, wherein at periodically successive points in time the instantaneous amplitude values of the voice signal are transformed into representative binary words which are then transmitted.

The basic task of a PCM time division multiplex exchange station is to through-connect the binary words appearing on the PCM receiving time division multiplex lines leading to the exchange station and in time channels which are assigned on these lines to the desired connection. Such a connection may be lines leading away from the exchange station wherein the signals are assigned to such lines in the time channels to which they are assigned. For signals arriving at the PCM time multiplex exchange station, or departing therefrom, a four wire through-connection is always involved, i.e. in the through-connection both transmission directions are to be considered separately. In PCM telecommunication networks with a plurality of PCM time division multiplex exchange stations these are generally operated synchronously to each other, i.e. at equal phase positions, also designated as trunk pulse frame, which can be achieved, for example, in an autosynchronization, by a so-called phase integration. For the transmission of the binary words within a call connection over a four-wire PCM time division multiplex line, connected with such an exchange station, there is customarily used in both transmission directions in each case the same time channel within the pulse frame based in each case on the trunk pulse frame of the exchange station on the transmission side in question (see for example, Proceedings IEE, Vol 111 (1964) No. 12, pp. 1976–1980). In addition thereto there is often provided within the individual PCM time division multiplex exchange stations a so-called asynchronous operation wherein the connection through-switching for both transmission directions occurs simultaneously in each case. For this purpose a so-called frame equalization is carried out through the insertion in each case of appropriately dimensioned delay line elements into the individual PCM-receiving time division multiplex lines leading to the individual PCM time division multiplex exchange stations. Using these delay lines in each case — seen from the exchange station in question - the total travel time (travel time to and from ) on the PCM time division multiplex line in question, proceeding between this exchange station and the adjacent exchange station in question, is supplemented by an amount corresponding to a total multiple of the system scanning period, with which in the pulse code modulation the amplitude samples are taken. Thus, the pulse frames of all PCM receiving time division multiplex lines, leading in each case to the PCM time division multiplex exchange station, coincide among each other in time as well as within the pulse frames (see BSTJ, Vol. XXXVIII (1959) pp. 909–932; Proc. IEE, Vol. 111 (1964) No. 12, pp. 1976–1980; Proc. IEE, Vol. 113 (1966) No. 9, pp. 1420–1428). In connection with the said fram equalization, preferably, an equalization of temperature-conditioned travel time fluctuations is carried out at the same time (see, for example, Proc. IEE, Vol. 113 (1966) No. 9, pp. 1420–1428).

In such an asynchronous operation, or even according to a newer suggestion (see British Pat. No. 1,257,124) in a so-called quasiasynchronous operation within the individual PCM time division multiplex exchange stations of a larger PCM telecommunication network the development of telecommunication connections is relatively simple. It can, since the correlation of the time channels used in each case for the two transmission direction in the individual PCM time division multiplex exchange stations is easily evident, be carried out jointly for both transmission directions in each case. However, an appropriate circuit design for the frame equalization and travel time fluctuation equalization required in each case is a prerequisite.

Deviating from the last-mentioned operational conditions, it is also possible to omit a frame equalization, and, since then the correlation of the time channels used in each case for the two transmission directions in the individual PCM time division multiplex exchange stations is then no longer easily evident, to carry out the actual connection establishment separately for each transmission direction, independent from the other transmission direction (see, for example, Proc. IEE, Vol. 113 (1966) No. 9, pp. 1429–1436). However, a costly and complicated reporting system becomes necessary in order to guarantee for the two transmission directions a perfect establishment of a desired connection and later a correct release of the particular connection in question.

It is, therefore, an object of this invention to provide a way to be able to disregard the need for an asynchronous or quasi-asynchronous operation within a PCM time division multiplex exchange station and still be able to carry out a connection establishment, jointly, for both transmission directions with simple means.

SUMMARY OF THE INVENTION

The invention concerns a process for a joint connection establishment for both transmission directions in a PCM telecommunication network comprising a plurality of PCM time division multiplex exchange stations connected among each other over four-wire operated PCM time division multiplex lines. According to the invention such a process is characterized by the face that in the individual PCM time division multiplex exchange stations, over which a connection is conducted, for the connection in question, in each case in a first free selection of a first free time channel, timely lying behind that time channel which on the PCM time multiplex line, leading in connection establishment direction (forward direction) to the PCM time division multiplex exchange station in question, is assigned to the connection in question. This first free time channel which is assignable on the PCM time multiplex line, leading from the PCM time multiplex exchange station in question to the PCM time division multiplex exchange station next following in connection establishment direction (adjacent in forward direction), to a connection, is selected and assigned to the connection in question. Thus in each case the time channels which are assignable to a connection on the PCM time division multiplex line leading from the PCM time division multiplex exchange station in question to the PCM time division multiplex exchange station preceding in connection establishment direction (adjacent in backward direction), a time channel, selected by the said preceding PCM time division multiplex exchange station and reported by it, is assigned to the connection in question. In a second free selection process a last free time channel, lying timely before that time channel which is assigned to the connection in question on the PCM time division multiplex line leading from the PCM time division multiplex exchange station in question to the PCM time multiplex division exchange station preceding in connection establishment direction (adjacent in backward direction), this last free time channel is assignable to a connection on the PCM time division multiplex line, leading to the PCM division multiplex line in question from the PCM time division multiplex exchange station succeeding in connection establishment direction (adjacent in forward direction), is selected and reported to the said next following PCM time division multiplex exchange station as the time channel to be assigned to the connection in question.

The invention makes it possible, in advantageous manner, in a PCM telecommunication network comprising a plurality of PCM time division multiplex exchange stations connected among one another over four-wire operated PCM time division multiplex lines, to be able to carry out a connection establishment in segments in each case simultaneously for both transmission directions, without being bound to the prerequisite of a frame equalization. Moreover, it affords the advantage of being able to get by with a very simple time channel number pre-announcement, which is only carried out during connection establishment. Later, for the connection release no time channel number announcements are required at all, as in the individual PCM time division multiplex exchange stations, over which such a connection to be released later is conducted, in connection with the time channel change. The time channel is to to be carried out in a given case at the same time with the through-connection of a connection in the PCM time division multiplex exchange station. In the seizing of the therefor used intermediate store (see, for example, Informations Telephone-Exchange Techniques Vol. 5 (1969) No. 1, pp. 48–59) information about the correlation of the time channel used in each case on the receiving side and the time channel used in each case on the transmission side is implicitly stored. Thus connection can be released in each case in the transmission a direction, "-pull-by-pull," with the transmission of an appropriate release criterion from both sides, without the necessity of a pre- or return announcement of channel members.

Advantageously in further development of the invention the time channel selected in the second free selection process can be reported in each case to the next following PCM time division multiplex exchange station through transmission of an appropriate information in that time channel which has in any event already been assigned to the connection in question on the PCM time division multiplex line leading to the next following PCM time division multiplex exchange station in the said first free selection process; an additional channel seizure for channel number pre-announcement is not necessary therefore.

BRIEF DESCRIPTION OF THE DRAWINGS

The invention will be best understood by reference to a description of a preferred mode for carrying out the process in conjunction with the drawings in which.

DETAILED DESCRIPTION OF THE DRAWINGS

Figure 1:
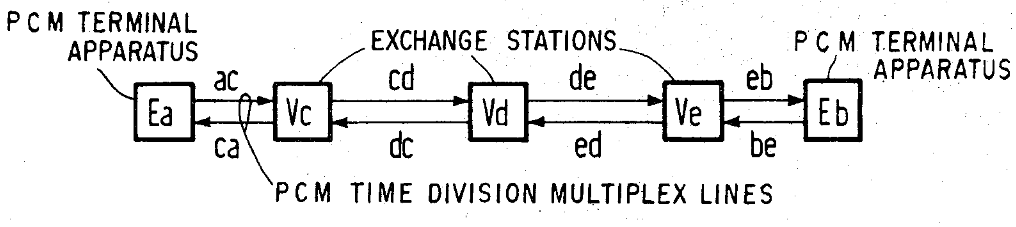
FIG. 1 is a block diagram of an exemplary network operating according to the process.

In the PCM telecommunication network shown in block form in FIG. 1, PCM time division multiplex exchange stations V*c*, V*d*, V*e* are connected among each other over four-wire PCM time division multiplex lines, i.e. PCM time division multiplex exchange station Vd is connected with PCM time division multiplex exchange station Vc over PCM time division multiplex line pair cd/dc, and with the PCM time division multiplex exchange station Ve over a PCM time division multiplex line pair *de*/*ed*, whereby the arrow direction indicated in FIG. 1 corresponds in each case to the transmission direction of the PCM time division multiplex line in question. In addition, a PCM terminal apparatus E*a* is connected with PCM time division multiplex exchange station V*c*, over a PCM time division multiplex line pair *ac*/*ca*, and a PCM terminal apparatus Eb with PCM time division multiplex exchange station V*e*, over a PCM time division multiplex line pair *eb*/*be*. The contents of each of the blocks discussed above are elements now well known and used for PCM, time multiplex transmissions.

Figures 2A, 2B, 2C, 2D, 2E:
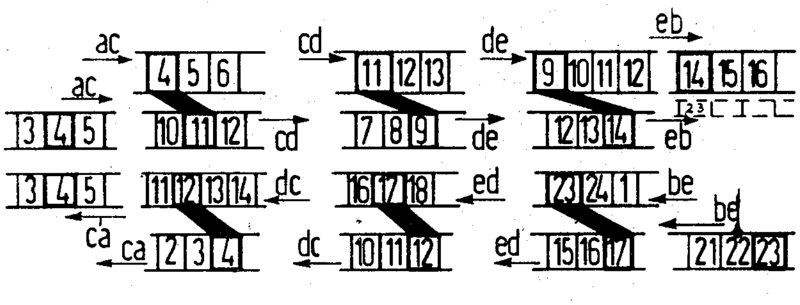
FIG. 2*a*–2*e* are a time channel chart for the FIG. 1 system.

It shall now be assumed that from the PCM terminal apparatus E*a* towards PCM terminal apparatus E*b*, a four-wire connection is to be established proceeding over PCM time division multiplex exchange stations V*c*, V*d*, V*e*. For this connection the PCM terminal apparatus E*a* represents the PCM terminal apparatus of origin, and the PCM terminal apparatus Eb represents the PCM terminal apparatus of destination. The connection establishment commences in that, from the PCM terminal apparatus of origin E*a*, on the PCM time division multiplex line *ac*, which leads to the PCM time division multiplex exchange station Vc next following in connection establishment direction (forward direction), a free time channel, i.e. one assignable to a connection, is selected and assigned to the connection in question. In FIG. 2*a* it is indicated in this connection that time channel 4 is selected by origin PCM apparatus E*a*, and is assigned to the connection in question on the PCM time division multiplex line *ac*. In addition the original PCM terminal apparatus E*a* reports to the next following PCM time division multiplex exchange station V*c* that time channel which is to be assigned to the connection in question on the PCM time division multiplex line *ca*, leading from PCM time division multiplex exchange station V*c* to the origin-PCM terminal apparatus E*a*. In FIG. 2*a* it is assumed that this is the same time channel, i.e. again time channel 4. Such as asynchronous operation in the origin PCM terminal apparatus has the advantage that the storing of the correlation of different time channels used for the two transmission directions can be omitted. It shall be noted, however, that the process according to the invention is not bound to such an asynchronous operation in the PCM terminal apparatus. It is now reported, in forward direction, i.e. over PCM time division multiplex line *ac*, in time channel 4, assigned to the connection to be established on this PCM time division multiplex line *ac*, to PCM time division multiplex exchange station V*c*, which time channel is to be assigned to the connection to be established on the PCM time division multiplex line *ca* in backward direction. This is, as has already been stated, also time channel 4.

In the PCM division multiplex exchange V*c*, in a first free selection process, that first free time channel which lies in time behind the time channel 4 which is assigned on the PCM time division multiplex line ac leading in connection establishment direction (forward direction) to PCM time division multiplex exchange station V*c*, to the connection to be established, is selected and assigned to the connection in question, which (first free time channel) is free on the PCM time division multiplex line *cd*, leading from the PCM time division multiplex exchange station V*c* to the PCM time multiplex exchange station V*d*, next following in connection establishment direction, i.e. adjacent thereto in forward direction, and is therefore assignable to a connection. In this connection it is indicated in FIG. 2*c* that as the first free time channel behind time channel 4 which is assigned on the PCM time multiplex line *ac* to the connection to be established, on PCM time division multiplex line *cd* time channel 11 is assigned to the connection in question. It is further indicated in FIG. 2*c* that of the time channels which are assignable to a connection, i.e., free, on the PCM time division multiplex line *ca*, time channel 4, selected by PCM terminal apparatus E*a* and reported to PCM exchange station V*c*, is assigned to the connection in question. In a second free selection process there is finally selected by PCM time division multiplex exchange station V*c* that last free time channel, lying in time before the last-mentioned time channel 4, assigned to the connection on PCM time division multiplex line *ca*, which is assignable to a connection on the PCM time division multiplex line *dc which leads from the PCM time division multiplex exchange station Vd*, next following in connection establishment direction, i.e. adjacent in forward direction, to the just considered exchange station V*c*. It is indicated in FIG. 2*c* that this is time channel 12. Time channel 12 is then reported to the said next-following PCM time division multiplex exchange station V*d* as the time channel to be assigned to the connection in question on the PCM time division multiplex line *dc*, over PCM time division multiplex line cd in time channel 11 here assigned to the connection in question.

In the next following PCM time division multiplex exchange station V*d*, the PCM time division multiplex lines leading thereto, in the example time division multiplex lines *cd* and *ed*, are, as is the case in the remaining PCM time division multiplex exchange stations and PCM terminal apparatus, interrogated continuously with regard to the appearance of new connection desires and, in a given case, seized in a time channel in question, as is known per se (see, for example, Siemens Periodical Vol. 3 (1963) No. 2, pp. 61–67; Informations - Telephone Exchanges 2 – 66, pp. 61–68, and 4–66, pp. 194–199; Informations-Telephone Exchanges 5 (1969) 1, 48–59, 57). After time channel 11 has been assigned, through PCM time division multiplex exchange station V*c*, to the connection to be established on PCM time division multiplex line *cd*, leading to PCM time division multiplex exchange station V*d* in connection establishment direction (forward direction), in the considered example, the PCM time division multiplex exchange station V*d* will thus determine on PCM time division multiplex line *cd* leading to it in this time channel, a connection desire and accordingly seize this time channel 11, in that, in a manner known per se, an appropriate coupling address is recorded in an appropriate holding store at the circulation phase corresponding to time channel 11. Now, PCM time division multiplex exchange station V*d* selects for the connection to be established in a first free selection process that first free time channel, lying in time behind the said time channel 11 which is assigned, on the time division multiplex line *cd*, leading in forward direction to the PCM time division multiplex exchange station V*d*, to the connection, which first free time channel is assignable on the PCM time division multiplex line *de*, continuing in forward direction from the PCM time division multiplex exchange station V*d*, to a connection, and assigns it to the connection in question. Such a free selection can take place in a manner known per se through testing of the contents of a cross point holding store (see, for example, Informations - Telephone Exchanges 4–66, pp. 194–199). The time channel assignment can be effected in manner known per se through recording of an appropriate cross point address into the holding store at the circulation phase corresponding to the time channel in question. In FIG. 2*d* it is indicated that time division multiplex exchange station Vd selects time channel 9 and assigns it to the connection in question on the PCM time division multiplex line *de*.

Of the time channels which are still assignable to a connection on the PCM time division multiplex line *dc*, leading from the PCM time division multiplex exchange station Vd to the PCM time division multiplex exchange station V*d* to the PCM time division multiplex exchange station V*c*, adjacent in backward direction, time channel 12 is assigned by the PCM time division multiplex exchange station V*d*, reported to it by the preceding PCM time division multiplex exchange station V*c*, over PCM time division multiplex line *cd* in the there seized time channel 11, as this is also shown in FIG. 2*d* at the bottom.

Finally, in a second free selection process, in PCM time division multiplex exchange station V*d*, that last free time channel is selected which lies in time before the last mentioned time channel 12 assigned to the connection to be established on the PCM time division multiplex line *dc*, which last free time channel is still assignable to a connection on the PCM time multiplex line *ed*, leading to PCM time division multiplex exchange station V*d* from the PCM time division multiplex exchange station V*e* adjacent to it in forward direction; In connection thereto it is assumed in FIG. 2*d* that this is time channel 17. This time channel 17 is reported to the next following PCM time division multiplex exchange station V*e* as the time channel, to be assigned to the connection in question on PCM time division multiplex line *ed*, over PCM time division multiplex linde *de* in the there seized time channel 9.

In a manner corresponding to the above explained processes subsequently the PCM time division multiplex exchange station V*e* also becomes active if it selects the time channels to be seized for the connection to be established on the PCM time division multiplex line pair *eb*/*be*, proceeding between PCM time division multiplex exchange station V*e* and the destination PCM apparatus E*b*, and assigns them to the connection to be established. In FIG. 2*e* it is indicated in this connection that there is assigned to the connection on PCM time division multiplex line *eb*, time channel 14, and on PCM time division multiplex line be time channel 23, whereby the latter is at first again reported in time channel 14 over PCM division multiplex line eb to the multiple PCM-terminal apparatus E*b*, and then seized from there in backward direction.

As can be seen from the foregoing, no asynchronous operation takes place in PCM terminal apparatus E*b*. The correlation of the time channels in each case assigned in forward direction and in backward direction on PCM time division multiplex line pair *eb*/*be* of the connection in question, can be ascertained in that for the duration of the connection an information is stored about the time channel reported from the preceding PCM time division multiplex exchange station Ve and assigned to the connection in question in backward direction, i.e., in the example, an information about time channel 23, associative to an information about the time channel assigned to the connection in question in forward direction, and in the example, an information about time channel 14. This is expressed in FIG. 2*b* in that storage places are there indicated referring to the individual time channels of the PCM time multiplex line *eb*, transmitting in forward direction, whereby in the storage place referring to time channel 14 the number of time channel 23 is noted, which is assigned to the connection in question on PCM time multiplex line be transmitting in backward direction.

Operation corresponding to the above explained processes can also take place in the establishment of other connections and in a given case in a differently developed PCM telecommunication network, without the need for any further explanations here. THe later connection release does not require any further reporting processes outside of the transmission of an appropriate release switching signal, as in the individual exchange stations already informations are stored in any event about the time channels used in the transmission direction in each case, as stated above. By reason of the foregoing, the connection release can be carried out from both side in each case in the transmission direction through the release of the time channels in question; however, this will note be pursued here any further, as it is not required for the understanding of the invention.

The means described hereinabove by which the process of this invention may be carried out is to be considered only as being exemplary. It is contemplated that many modifications and changes will occur to those skilled in the art, but will still be within the scope of the appended claims.

We claim:

1. In a PCM time division multiplex telecommunication network, a process for the joint completion of connections in both transmission directions, said network having a plurality of PCM time division multiplex exchange stations connected among each other over four wire PCM time division multiplex lines, a connection being thereby completed between predetermined ones of said exchange stations, said process comprising the steps of:

assigning to each of said predetermined exchange stations in a first free selection process a first free time channel lying, in time, behind the time channel assigned to said connection being completed over a transmission line leading to a respective predetermined exchange station, said first free time channel being assignable to said connection being completed over a transmission line leading from said respective predetermined exchange station to the next succeeding exchange station in said connection being completed, assigning a second time channel to a connection leading to the next preceding exchange station in the connection being completed, said second time channel being selected and reported by said next preceding exchange station, and assigning to said connection being completed in a second free selection process a last free time channel lying, in time, before said second time channel which is assignable to said connection on a line leading to said respective exchange station from said next succeeding exchange station.

2. The process defined in claim 1 wherein the assignment of said last free time channel is reported to said next succeeding exchange station on said first time channel.

3. The process defined in claim 1 wherein said network includes an origin terminal apparatus connected to said next preceding exchange station comprising the additional steps of:

assigning a third time channel over a transmission line leading from said origin terminal apparatus to said next preceding exchange station, and reporting the assignment of said third time channel over a transmission line leading from said next preceding exchange station to said origin terminal apparatus.

4. The process defined in claim 1 wherein said network includes a destination terminal apparatus connected to said next succeeding exchange station, comprising the additional steps of:

storing in said destination terminal apparatus information about a fourth time channel reported from said next succeeding exchange station and assigned to said connection being completed in a destination to origin direction, and storing in association therewith information about a fifth time channel extending from said origin to said destination.

* * * * *